UNITED STATES PATENT OFFICE.

HERMANN LORCH, OF MILWAUKEE, WISCONSIN.

PREPARING AND CURING SPELT.

SPECIFICATION forming part of Letters Patent No. 318,768, dated May 26, 1885.

Application filed November 19, 1884. (No specimens.)

*To all whom it may concern:*

Be it known that I, HERMANN LORCH, of Milwaukee, in the county of Milwaukee, and in the State of Wisconsin, have invented certain new and useful Improvements in Preparing and Curing Spelt; and I do hereby declare that the following is a full, clear, and exact description thereof.

My invention relates to the method of preparing a food product suitable for soup, &c., from a species of grain known as "spelt" or *Triticum spelta*, all as will be more fully set forth hereinafter.

While the grain is still green, and about two weeks before it is ripe, I cut it and separate the ears from the stalks, and place the ears in an apparatus for drying and smoking them, which may be any suitable oven or chamber with a perforated bottom, the holes in which are small and about half an inch apart, so as to admit the smoke from a fire below fed with green wood or wood not quite dry, and this fire and smoke are continued until the green kernels are thoroughly dry and hard, after which the ears are removed and the kernels separated from the husks by thrashing. The grain thus obtained is immediately put into a room the temperature of which is 23° to 25° Reaumur, (say from 84° to 88° Fahrenheit,) and here the grain is allowed to remain at substantially this temperature for two days. The grain is then removed and cracked or coarsely ground and put into metallic boxes having tight covers and false sieve-like bottoms, (of netting, wire, or any fabric,) below which is a true bottom and a hole to admit a pipe from another tight vessel or furnace, in which various spices may be placed and heated, so as to give off their vapors, which will thus be conducted to the vessel containing the cracked grain, which is thus successively subjected for ten hours each to the vapors of pepper, nutmeg, and juniper-berries, and thereby becomes thoroughly impregnated with their combined flavors. At the end of the thirtieth hour the cracked grain is removed and hermetically sealed in cans, and is then ready for sale or use, as thereby the flavors will be preserved and the product kept in proper condition for use for any length of time desired.

My food product may be used in a variety of ways, but makes a delicious soup, being used after the manner of barley or rice soup, and requiring no spicing or flavoring.

The particular mechanism or apparatus employed is not essential, and any devices may be used which will accomplish the desired result.

I do not herein claim my food product, as that forms the subject of a separate application for patent filed April 17, 1885, Serial No. 162,589.

Having thus described my invention, what I claim as new, and desire to secure by Letters Patent, is—

The hereinbefore-described process of preparing and curing spelt for a food product, consisting in subjecting the ears of the grain in a green state to heat and smoke from green wood until dry, then separating the kernels from the husks and subjecting them for two days to a temperature of about 84° to 88° Fahrenheit, then cracking or coarsely grinding the kernels and subjecting the product for ten hours each and successively to the vapors of heated pepper, nutmeg, and juniper-berries, substantially as set forth.

In testimony that I claim the foregoing I have hereunto set my hand, at Milwaukee, in the county of Milwaukee and State of Wisconsin, in the presence of two witnesses.

HERMANN LORCH.

Witnesses:
S. S. STOUT,
H. G. UNDERWOOD.